(12) United States Patent
Dubois et al.

(10) Patent No.: US 7,362,449 B2
(45) Date of Patent: Apr. 22, 2008

(54) DIGITAL HOLOGRAPHIC MICROSCOPE FOR 3D IMAGING AND PROCESS USING IT

(75) Inventors: Frank Dubois, Brussels (BE); Catherine Yourassowsky, Brussels (BE)

(73) Assignee: Universite Libre de Bruxelles (BE)

( * ) Notice: Subject to any disclaimer, the term of this patent is extended or adjusted under 35 U.S.C. 154(b) by 309 days.

(21) Appl. No.: 10/557,240

(22) Filed: Nov. 16, 2005

(65) Prior Publication Data

US 2008/0018966 A1    Jan. 24, 2008

(30) Foreign Application Priority Data

May 16, 2003 (EP) .................. 03447111
Oct. 16, 2003 (EP) .................. 03447256

(51) Int. Cl.
*G01B 11/02* (2006.01)
(52) U.S. Cl. .................................. 356/515
(58) Field of Classification Search ............... 356/515
See application file for complete search history.

(56) References Cited

U.S. PATENT DOCUMENTS 3,556,660 A * 1/1971 Mottier .................. 356/498
4,165,938 A * 8/1979 Doyle .................... 356/455

FOREIGN PATENT DOCUMENTS

SU        844995 A   *   7/1981
WO    WO 03/002972 A2    1/2003

OTHER PUBLICATIONS

Dubois et al., "Improved three-dimensional imaging with a digital holography microscope with a source of partial spatial coherence," *Applied Optics*, vol. 38, No. 34, pp. 7085-7094, Dec. 1, 1999.
Pretzler et al., "High-accuracy differential interferometry for the investigation of phase objects," *Measurement Science and Technology*, vol. 4, No. 6, pp. 649-658, Jun. 1, 1993.
Indebetouw et al., "Spatiotemporal digital microholography," *J. Opt. Soc. Am. A.*, vol. 18, No. 2, pp. 319-325, Feb. 2001.

* cited by examiner

*Primary Examiner*—Tarifur Chowdhury
*Assistant Examiner*—Jonathon D Cook
(74) *Attorney, Agent, or Firm*—Knobbe Martens Olson & Bear LLP

(57) ABSTRACT

The present invention is related to a compact microscope able to work in digital holography for obtaining high quality 3D images of samples, including fluorescent samples and relatively thick samples such as biological samples, said microscope comprising illumination means (1,41) at least partially spatially coherent for illuminating a sample (2) to be studied and a differential interferometer (5) for generating interfering beams from said sample (2) on the sensor (33) of an electronic imaging device(7), said interferometer (5) comprising namely tilting means (17) for tilting by a defined angle one the interfering beams (28 or 29) relatively to the other, said tilting resulting into a defined shift (27) of said interfering beam on the sensor of the electronic imaging device (7), said shift (27) being smaller than spatial coherence width of each beam, said microscope being able to be quasi totally preadjusted independently from the samples so that minimum additional adjustments are required for obtaining reliable 3D images of samples.

32 Claims, 2 Drawing Sheets

DIGITAL HOLOGRAPHIC MICROSCOPE FOR 3D IMAGING AND PROCESS USING IT

This is the U.S. National Phase of International Patent Application No. PCT/BE2004/000075, filed on May 17, 2004 under the Patent Cooperation Treaty (PCT), which was published by the International Bureau in English on Nov. 25, 2004 as WO 2004/102111 A1, which designates the U.S. and which claims priority from European Patent Application No. 03447111.0 filed May 16, 2003 and European Patent Application No. 03447256.3 filed Oct. 16, 2003.

FIELD OF THE INVENTION

The present invention relates to digital holographic microscopy.

More particularly, the present invention concerns an improved digital holographic microscope and a process for obtaining with low temporal distortion high quality three-dimensional images of samples including fluorescence samples and thick samples.

STATE OF THE ART

The principle of interferometry has been set up for a long time.

Digital holography and shearography correspond two different fields of interferometry.

In shearography, a sample consisting in a diffusive structure and illuminated by a coherent beam creates a speckle field. This speckle field is interfering with itself after being shifted by a shearing distance. As the information about the sample is carried by the interfering speckle fields, the highly coherent illumination with a laser is mandatory.

It results that shearography interferometers in general, and in particular the shearography interferometer disclosed in the document U.S. Pat. No. 5,257,089, is not conceived so as to allow an accurate adjustment of the interferometric paths, which makes them unusable with illumination sources such as partially coherent illumination sources.

Moreover, the way to process the information in shearography is also different from the way to process the information in digital holography: in shearography, the information is extracted by comparing the interfering speckle fields in two different states of the analysed sample in order to analyse structure deformation of the sample. However the quality of the obtained images is not sufficient for microscopy applications, on the contrary to digital holography.

Comparatively, digital holography consists in recording fringe interference patterns from a sample illuminated by an illumination source and the holographic reconstruction is performed by numerical means [1].

Several optical methods have been implemented to extract the phase and amplitude information of the object beam from the recorded interference pattern [2-3]. With the phase and the amplitude information, the digital holography reconstruction simulates the optical beam propagation by using a discrete implementation of the Kirchhoff-Fresnel (KF) propagation equations.

The digital holographic methods have been performed in various experimental situations [4-12], and are very promising in optical microscopy where the three-dimensional reconstruction capability overcomes the very limited depths of field due to the high magnifications [13-15, 24].

When a digital hologram of an experimental sample is recorded, the digital holographic reconstruction consists in refocusing by numerical means and without any mechanical motion the sample slice by slice in such a way that samples thicker than the depth of field of usual optical microscope can be investigated. Experimentally, it has been shown that comparatively to classical transmission microscopy, the depth of investigation in digital holography is multiplied by a factor of approximately 80 [15]. The reasons for such greater performances are the following:

As there is no mechanical motion, the recoding for the complete information about the sample volume requires only few images (typically 1, 3, 4 or 5—depending on the expected optical quality of the result). It results that dynamical phenomena can be investigated with low time distortion;

Thanks to the several recorded images, all the sample information is recorded in optical phase and optical intensity images. It results that the data are considerably compressed with respect to classical microscopes using mechanical translation devices to scan the sample in depth.

Several implementations of the digital holography have been proposed.

For example, T. Zhang and I. Yamaguchi proposed an apparatus having a Mach-Zehnder interferometer configuration where the sample is in one arm of the interferometer [13]. There is a piezoelectric transducer that allows the implementation of the phase shifting technique [2] for an accurate determination of the optical phase of the signal. However, this apparatus uses a laser beam, as very often in holography, which is a source of coherent noise in the obtained results.

Recently an apparatus having a configuration without imaging lens between the sample and the electronic image sensor has been proposed in a document of the same authors [14]. The authors show that it is possible to change the magnification of the apparatus by changing the shape of the reference beam. However, this apparatus has the same drawback as the previous one as it also uses a laser source.

It has also been proposed to use an apparatus having a Michelson interferometer configuration with a laser beam source in order to investigate samples in reflection [7]. A piezoelectric transducer allows the implementation of the phase stepping method. However, this configuration is limited to specific applications requiring reflection illumination mode.

An apparatus combining a Mach-Zehnder configuration with a phase stepping method with a partial coherent source has also been disclosed [15, 24]. The use of this type of illumination allows to drastically reduces the problem of coherent noise created by a laser beam. This apparatus provides very high quality results but hence requests for each new sample complex optical adjustments. Optical requirements to be fulfilled when working with this type of illumination sources have been underlined in prior art documents [15, 19, 24].

It has also been proposed a method to avoid diffraction effects on the hologram borders and a scheme to perform 3D pattern recognition based on the digital holograms obtained with the microscope [16, 17].

In order to investigate fluorescent samples, special interferometers have been proposed.

For example, the patent application WO03/002972 thus describes the coupling of a digital holographic microscope using a partially coherent light with a fluorescence excitation source in order to allow the 3D reconstruction of fluorescence signals [18]. The process for using this microscope comprises the step of merging both signals to perform the reconstruction of the fluorescence signal. Although this microscope is powerful, it requires to differenciate the fluorescent parts of the sample from the background for the digital holographic signal, and it cannot work with only fluorescent illumination.

Other implementations of digital holographic microscopy are disclosed in the references 19-20. In said two references, the authors proposed an interferometer configuration wherein the sample can be placed in front of a Mach-Zehnder or Michelson interferometer, and wherein the sample signal is traveling in both arms of the interferometer. In order to retrieve a configuration that is similar to digital holography interferometers described hereabove, wherein the sample is placed in one arm of the interferometer, the authors place a focusing stage and a pinhole in the reference arm of the interferometer. The role of this subsystem is to smooth by optical filtering process the reference beam that becomes similar to a reference beam in the previous configurations. This configuration allows, in principle, to implement digital holography for fluorescent samples.

However, the filtering process in the reference beam considerably changes the illumination level and the coherence properties of the reference beam. This change in the illumination level has to be adapted by balancing the beam ratio in the arms of the interferometer. Moreover, the change of the partial coherent properties implies to work in a defocus mode to obtain point spread functions of similar size for the object and the reference beams. This results into a weak contrast for interferometric fringes. In addition, the digital holographic reconstruction is less powerful, leading to a significant decrease of the resolution. Finally, the authors give no experimental examples in the case of fluorescence samples.

There exist also digital holography interferometers based on a scanning system and a heterodyne detection system to record digital holograms. With these interferometers, the sample is scanned by two focused beams interfering at the same location[21, 22]. The diffused light or the fluorescence light and the reference beam are detected respectively by a photo-multiplier and by a photodiode. The hologram construction is performed by electronic means that makes these interferometers very different with respect to the previous ones. Moreover, as attested by the publications, the image quality is rather poor.

In other words, the apparatus according to the prior art present technical constraints such as the choice of a limited range of illumination sources, multiple and complex adjustments, complexity of data treatments, reliability of the three-dimensional reconstruction, limited image quality.

Aims of the Invention

The present invention aims to provide an apparatus and a process for obtaining by digital holographic microscopy three-dimensional images of a sample which could be an alternative to the prior art apparatus and processes mentioned hereabove.

In particular, the present invention aims to provide an apparatus and a process which give very high quality images of a sample with moderate acquisition time.

Another aim of the invention is to provide an apparatus and a process allowing the use of light sources with different levels of coherences ranging from coherent light sources to incoherent light sources, including partially coherent light sources.

In particular, the present invention aims to provide an apparatus and a process for investigating fluorescent samples.

Another aim of the present invention is to provide an apparatus and a process adapted to low noise three-dimensional imaging of strong optical phase distorted samples.

The present invention further aims to provide an apparatus and a process easy to use, namely with reduced technical adjustments comparatively to the apparatus and processes of the prior art.

The present invention also aims to provide an apparatus and a process of moderate cost comparatively to the apparatus and processes of the prior art.

SUMMARY OF THE INVENTION

The present invention is related to a microscope able to work in digital holography for obtaining 3D images of a sample, said microscope comprising as elements at least:

(i) illumination means for illuminating in transmission and/or in reflection a sample and producing thereby a sample beam, said illumination means being characterised by a given spectral width having a maximum illumination wavelength, said illumination means being selected from the group consisting of temporally coherent and spatially partially coherent illumination means, temporally and spatially partially coherent illumination means, and fluorescence excitation sources;

(ii) imaging means comprising a microscope objective having a front focal plane, and focusing means having a back focal plane;

(iii) an interferometer for generating interfering beams from the sample beam, said interferometer being located behind the microscope objective and in front of the focusing means, and comprising a first interferometer arm and a second interferometer arm, the focusing means having one front focal plane in each of said first and second interferometer arms, said first interferometer arm comprising a first beam splitter a first reflecting element and a second beam splitter, said second interferometer arm comprising the first beam splitter, a second reflecting element and the second beam splitter, wherein some of said reflecting elements and beam splitters are mounted on moving means so as to equalise the optical length of the interfering beams with an accuracy in the range of less than the maximum wavelength of the illumination means to a few maximum wavelengths;

(iv) an electronic or digital imaging device provided with a sensor which is located in the back focal plane of the focusing means, for detecting and recording the fringe interference images formed thereon by the interfering beams;

(v) processing means, such as a computer, conceived for at least processing said fringe interference images by digital holography techniques;

said microscope being characterised in that said it further comprises:

(vi) a positioning stage located outside the interferometer in front of the microscope objective for positioning the sample substantially in the front focal plane of the microscope objective;

(vii) tilting means located in the second interferometer arm (respectively in the first interferometer arm) for tilting the beam reflected by the second reflecting element (respectively first reflecting element) relatively to the beam reflected by the first reflecting element (respectively the second reflecting element) by a precise tilting angle in such a way to superpose the beam reflected by the first reflecting element (respectively the second reflecting element) and the beam reflected by the second reflecting element (respectively the first reflecting element) in the front focal planes of the focusing means thereby creating a precise shift between the interfering beams reflected and transmitted by the second beam splitter on the sensor of the electronic imaging device.

Preferably, the first reflecting element corresponds to a first mirror, the second reflecting element corresponds to a second mirror and the first mirror and the second beam splitter are mounted together on the moving means.

Alternatively, the first beam splitter and the second reflecting element are parts of a first prism (34), while the second beam splitter and the first reflecting element are parts of second prism, the first prism being mounted on the moving means.

According ton one preferred embodiment, the tilting means of the microscope comprise a wedge and the microscope comprises a complementary optical compensator in the first interferometer arm (respectively the second interferometer arm).

According to another preferred embodiment said tilting means comprise the second reflecting element mounted on translation and/or rotation means.

Possibly, the first reflecting element is mounted on a transducer, preferably a piezo-electric transducer, of calibrated motions to implement a digital holography processing by the processing means according to the phase-stepping method.

Alternatively, the microscope according the invention further comprises shifting means for shifting with a precise shift the beam reflected by the first reflecting element (the second reflecting element) relatively to the beam reflected by the second reflecting element (the first reflecting element) in the front focal planes of the focusing means so as to introduce a precise fringe modulation at the interfering beams reflected and transmitted by the second beam splitter 14 compatible with a digital holography processing by the processing means according to the Fourier transform method.

Preferably, said shifting means comprise the first reflecting element and the second beam splitter mounted on the moving means.

Alternatively, said shifting means comprise the wedge mounted on translation and/or rotation means.

Said shifting means may also comprise the second mirror (15) mounted on translation and/or rotation means.

Preferably, the moving means comprise a rotating plate.

The present invention also concerns a process for obtaining 3D images of a sample using a digital holographic microscope according to any one of the preceding claims, said process comprising the following steps:

providing the illumination means, the imaging means including an objective and focusing means, the differential interferometer, the imaging device and the processing means, the positioning stage, and the tilting means;

placing the positioning stage outside the interferometer in the front focal plane of the microscope objective;

positioning the imaging device so that its sensor is placed in the back focal plane of the focusing means;

positioning the interferometer between the objective and the focusing means;

placing at least some of the reflecting elements and the beam splitters of the interferometer on moving means so as to form a movable part;

performing position and orientation preadjustments of the microscope by addition of a test sample, by:

(i) placing the test sample on the positioning stage (3);

(ii) illuminating in transmission and/or in reflection with the illumination means said test sample and producing thereby a test sample beam;

(iii) generating by means of the interferometer interfering beams from said test sample beam;

(iv) adequately positioning and orientating the movable part of the interferometer so as to equalise the optical length of said interfering beams with an accuracy in the range of less than the maximum wavelength of the illumination means to a few maximum wavelengths by means of the moving means;

(v) adequately positioning and orientating the tilting means in the second interferometer arm (respectively in the first interferometer arm) for tilting the beam reflected by the second reflecting element (respectively first reflecting element) relatively to the beam reflected by the first reflecting element (respectively the second reflecting element) by a precise tilting angle in such a way to superpose the beam reflected by the first reflecting element (respectively the second reflecting element) and the beam reflected by the second reflecting element (respectively the first reflecting element) in the front focal planes of the focusing means thereby creating a precise shift between the interfering beams reflected and transmitted by the second beam splitter on the sensor of the electronic imaging device;

(vi) detecting and recording the fringe interference image thus formed by the interfering beams on the sensor of the imaging device;

once the microscope has been thus pre-adjusted, replacing the test sample by a sample to studied and illuminating said sample so as to obtain an interference image as disclosed in (i) to (vi);

recording said interference image;

possibly acquiring other similar interference images from said sample by implementation of the phase-stepping method;

processing said interference image(s) so as extract the optical amplitude and phase of the sample by implementation of the phase stepping method or the Fourier transform data processing.

Preferably, the tilting means comprise a wedge and the microscope comprises a complementary optical compensator in the first interferometer arm (respectively the second interferometer arm).

Alternatively, said tilting means comprise the second reflecting element mounted on translation and/or rotation means.

According to one preferred embodiment, the first reflecting element is placed on a transducer, preferably a piezoelectric transducer to implement the phase-stepping method.

According to another preferred embodiment, the microscope further comprises shifting by means of shifting means with a precise shift the beam reflected by the first reflecting element(the second reflecting element) relatively to the beam reflected by the second reflecting element (the first reflecting element) in the front focal planes of the focusing means so as to introduce a precise fringe modulation at the interfering beams reflected and transmitted by the second beam splitter compatible with a digital holography processing by the processing means according to the Fourier transform method.

Preferably, said shifting means comprise the first reflecting element and the second beam splitter (14) mounted on the moving means.

Alternatively, said shifting means comprise the wedge mounted on translation and/or rotation means.

Possibly, said shifting means comprise the second mirror mounted on translation and/or rotation means.

Preferably, the moving means comprise a rotating plate.

The present invention is also related to the use of said microscope or said process:
- to study fluorescent and/or thick samples;
- in differential contrast microscopy;
- in vivo 3D imaging applications;
- to measure three-dimensional micro-distributions of refractive indexes in a sample;
- and to study fast phenomena.

DEFINITIONS

Reference is made to the section entitled "State of the art" to find a definition of "digital holography".

In the present description, the partial coherence of an optical beam is defined in a plane and establishes the capability of any couple of points to mutually interfere. There exist references describing accurately the partial coherence states of the light [28].

For partial coherence, a difference is made between "spatial partial coherence" and "temporal partial coherence".

The "spatial partial coherence" quantifies the statistical phase correlation of a light distribution in a plane at any couple of points. It can be shown that reducing the spatial coherence in an optical imaging system reduces the coherent noise originated from the light scattering, the multiple reflections and the defects of the optical set up [15-18, 24].

The "temporal coherence" is related to the spectral width of an optical source and establishes the reduction of fringe contrast when there is an optical path difference between the beams of a two optical paths interferometer. The reduction of the temporal coherence results also in a reduction of the coherent noise in an imaging system [29].

SHORT DESCRIPTION OF THE DRAWINGS

DETAILED DESCRIPTION OF THE INVENTION

Nature of the Illumination Means:

Partially coherent illumination means have been disclosed in the reference [18]. In said reference [18], a first method to obtain a partially spatial coherent illumination increases the spatial coherence of a spatially incoherent light source by filtering the beam with an appropriate set up constituted by focusing means and apertures.

It has to be understood that the source has a spectral bandwidth centered on a maximum wavelength (peak wavelength).

Examples of such sources are light emitting diodes, broadband sources filtered by a spectral filter and discharge lamps with spectrally filtered emission lines.

In an interferometer, such sources are of low temporal coherence and accurate adjustments of the optical paths have to be implemented.

A second method to obtain partially spatial coherent illumination in reference [18] reduces the spatial coherence by adequately inserting a moving ground glass in the optical beam of a highly coherent source as a laser beam. This method provides sources with an adjustable spatial coherence while keeping a high temporal coherence.

FIRST PREFERRED EMBODIMENT

Figure 1:
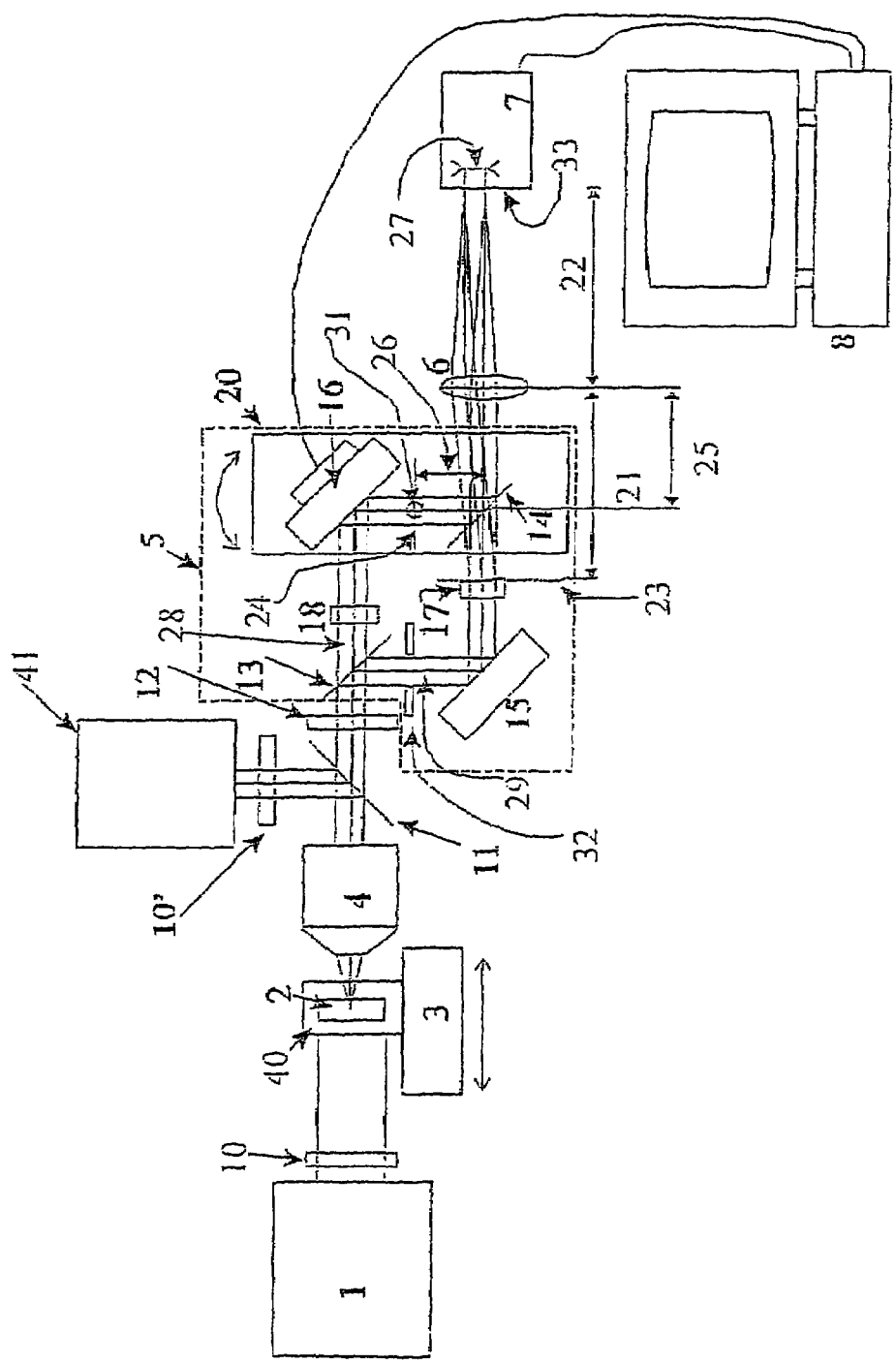
FIG. 1 represents a first preferred embodiment of a digital holographic microscope according to the present invention.

A first preferred embodiment of the microscope according to the present invention is present in FIG. 1.

As shown by FIG. 1, in said first preferred embodiment, the microscope comprises illumination means 1 able to work in a transmission mode and illuminations means 41 able to work in a reflection mode. In this preferred embodiment, the microscope is thus able to work selectively in transmission mode or in reflection mode by selectively switching on the adequate illumination means 1 or 41, respectively, while the other illumination means 41 or 1 respectively remains switched off.

However, it is obvious for the man skilled in the art that a microscope according to the invention may comprise only one of said illumination means 1 or 41.

Said illumination means 1, 41 are partially coherent, and have to present, at least, partial temporal coherence. 41.

The microscope as illustrated in FIG. 1 also comprises a sample holder 40 able to receive a sample 2 under investigation and arranged on a positioning stage 3, and imaging means comprising an objective or microscope lens 4 and focusing means 6. The microscope objective 4 may have different magnification as in usual microscopy.

The positioning stage 3 allows an accurate positioning of the sample 2 relatively to the objective 4, more precisely an accurate positioning of the sample 2 in the front focal plane of the objective 4. For this purpose, the sample support 3 may optionally be motorized.

In the reflection mode, the light beam emitted by the illumination means 41 is reflected by a beam splitter 11 and transmitted by the microscope objective 4 to illuminate the sample 2.

The microscope according to this first preferred embodiment further comprises a differential interferometer 5, of Mach-Zehnder interferometer type, which is located between the objective 4 and the focusing means 6. Said differential interferometer comprises a first and a second interferometer arms corresponding to two different optical paths 28, 29. The focusing means 6 have one front focal plane 23, 24 in each of said first and second interferometer arms.

The first interferometer arm 28 comprises a first beam splitter 13, a first reflecting element corresponding to a mirror 16 and a second beam splitter 14. In this first preferred embodiment, the first interferometer also comprises a transparent plate 18 acting as an optical compensator the function of which will be explained hereafter.

The second interferometer arm 29 comprises the first beam splitter 13, a second reflecting element corresponding to a mirror 15 and the second beam splitter 14. In this first preferred embodiment, the second interferometer also comprises an optical wedge 17 conceived for acting as tilting means or a beam deviator (see hereafter).

It should be noted that the first mirror 16 and the second beam splitter 14 are mounted on moving means, such as a rotating plate 20.

Preferably, the microscope further comprises an electronic two-dimensional imaging device 7 such as a CCD camera, said electronic imaging device 7 including a sensor 33 and being defined by a pixel size and a number of pixels in one dimension. Said imaging device 7 is arranged in the microscope so that its sensor 33 is located in the back focal plane of the focusing means 6.

Preferably, the microscope also comprises processing means such as a computer 8.

It should be noted that the microscope is able to work with fluorescent samples either in transmission or in reflection mode.

When the microscope is adapted to work with fluorescent samples, the illumination means 1 or 41 has a spectral bandwidth centered on a specific excitation wavelength, or the illumination means 1 or 41 has a broad spectral bandwidth which is filtered by an appropriate reduced spectral bandwidth filter 10 or 10' such as an interference filter. A spectral bandwidth barrier filter 12 is placed after the beam splitter 11 in the reflection illumination mode and after the microscope objective 4 in the transmission illumination mode. This filter 12 can be also placed directly in front of the sensor of the electronic imaging device 7. The filter 12 is a spectral band pass filter that has only a high transmission for the fluorescent wavelength spectral band. For applications requiring several different fluorescence excitations and emissions with specific wavelengths, filters 10, 10' and 12 can be changed with motorized filter holders.

In any cases, the process for obtaining 3D images of a sample 2 under investigation using the microscope according to the invention comprises the following steps. The sample 2 has been approximately (substantially) placed at the front focal plane of the microscope objective 4.

When the sample 2 has a thickness that makes impossible to simultaneously focus the entire sample thickness, it is placed thanks to the positioning stage 3 in front of the microscope objective 4 in such a way that the front focal plane of the microscope objective 4 crosses the sample volume.

The optical beam coming from the sample 2 (sample beam) is then transmitted by the microscope objective 4 and is incident on the beam splitter 13. The beam splitter 13 splits the sample beam into a transmitted beam 28 and a reflected beam 29.

The transmitted beam 28 is transmitted by the optical compensator 18 corresponding to a transparent plate such as an optical flat. Then said transmitted beam 28 is reflected by the mirror 16, is reflected by the beam splitter 14 and transmitted by the focusing mean 6 which images the front focal plane of the microscope objective 4 on the sensor 33 of an electronic imaging device 7.

The magnification of the image obtained on the sensor 33 is given by the ratio $f/f_{ML}$ where f is the focal length of the focusing means 6 and $f_{ML}$ is the focal length of the microscope objective 4.

The beam 29 reflected by the beam splitter 13 is then reflected by the mirror 15, transmitted by the wedge 17, said tilting means acting so as to modify the propagation direction of the incident beam. Said beam 29 is then transmitted by the beam splitter 14 and transmitted by the focusing mean 6 that images also for this beam the front focal plane of the microscope objective 4 on the sensor 33 of the electronic device 7.

It should be noted that the wedge 17 can be placed on a positioning and orientation device.

The interference images between the two beams are recorded by the electronic imaging device 7 and digitized by the computer 8 that is also used to implement all the digital holographic processing.

The role of the beam deviator 17 is to change the propagation direction of the beam reflected by the mirror 15 with respect to the beam reflected by the mirror 16. This is performed in such a way that the intensity distributions of the two interferometer paths are equal and superposed without shift in the front focal planes 23 and 24 of the focusing means 6. The beam deviator 17 creates a shift 27 on the input sensor 33 of the electronic imaging device 7, between the beams that are reflected and transmitted by the beam splitter 14.

It should be noted that the locations of optical components 17 and 18 may be interchanged without changing the operations of the microscope, with the provisio that the superposition condition in the front focal planes 23, 24 of the focusing means 6 is fulfilled.

Moreover, as the digital holographic microscope is working with partially coherent illumination, there are a set of required adjustments to adequately align it. In that case, the temporal coherence of the illumination means requests to equalize the optical paths 13-16-14 and 13-15-14 with a typical accuracy in the range of less than the peak wavelength to a few peak wavelengths of the illumination means 1 or 41.

The role of the transparent plate 18 is to compensate the global optical path changed introduced by the wedge 17.

However, in practice, the available tolerances on the thickness of such components are not enough with respect of the need of the present invention. Therefore, a very fine optical path adjustment is achieved by placing the mirror 16 and the beam splitter 14 on the high accuracy rotating plate 20 with a rotation axis 31 which is perpendicular to the plane of FIG. 1 and is located between the mirror 16 and the beam splitter 14.

In an equivalent way, the rotating plate 20 may be alternatively positioned to rotate simultaneously the beam splitter 13 and the mirror 15.

Furthermore, in order to record high contrast interferences between the two optical beams on the sensor 33 of the electronic imaging device 7, the spatial coherence function of each beam 28, 29 has to be larger than the lateral shift 27. In practice, the lateral shift 27 is for example smaller than the pixel size of the imaging means 33 which is typically 7 μm×7 μm.

In the first preferred embodiment, the microscope is able to work in digital holography and is specifically adapted to implement the phase-stepping method. For this purpose, the first mirror 16 is placed on a piezoelectric transducer that allows sub-wavelength translation of its reflecting surface in a direction perpendicular to its reflecting surface. This motion capability is used to implement the phase stepping method in order to extract the optical phase and the intensity information from the interference pattern between the two beams. With the phase stepping method, several interference patterns with an incremental optical path change between the two beams are recorded by the imaging device 7 and the computer 8.

The corresponding interference images are combined in an algorithm which computes thanks to the computer 8 the optical phase changes between the two beams.

For multi-spectral implementation, a specific calibration of the piezoelectric transducer motion amplitude is required for each used wavelength band.

It should be noted that in the present invention, the computer 8 is driving the piezoelectric motions of the mirror 16. Computer 8 may also control the light sources 1 and 41 and optionally associated filters 10, 10', 12, the rotation plate 20 and the positioning stage 3.

The resulting phase information is related to the differential object phase in the direction of the shift 27. It is integrated in order to achieve the object optical phase information.

However, the intensity of the object can be also directly recorded by recording an image with one arm of the interferometer closed by a mechanical shutter 32 placed in the optical beam 29. The shutter may be placed anywhere in one of the two optical beams 29 and 28 in such a way that it closes only one of the beams.

In both cases, the combination of the object optical phase and intensity are merged to compute the object (sample) optical amplitude which is used for digital holographic three dimensional imaging.

SECOND PREFERRED EMBODIMENT

Figure 2:
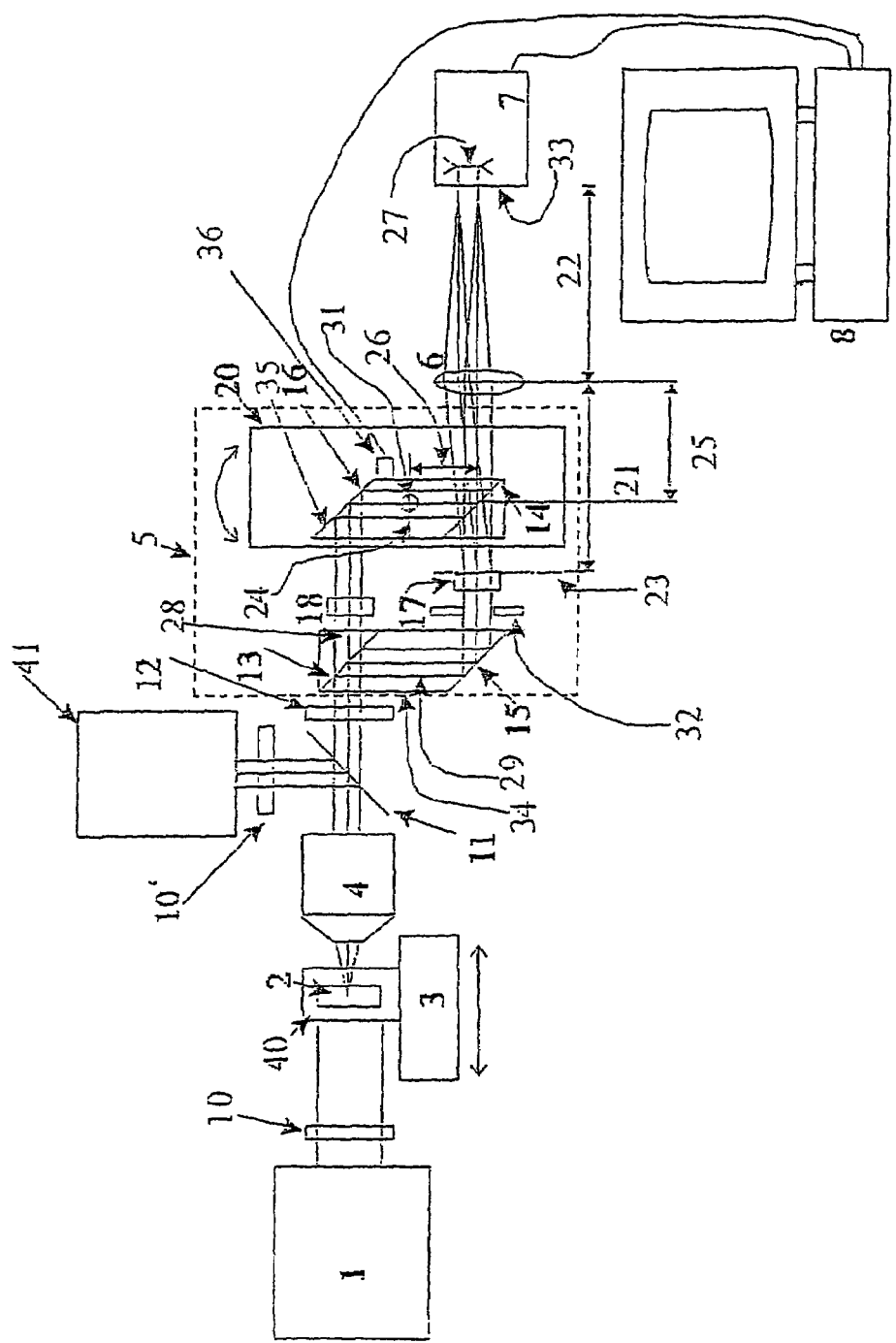
FIG. 2 represents a second preferred embodiment of a digital holographic microscope according to the present invention.

A second preferred embodiment of a microscope according to the present invention is illustrated in FIG. 2. In this second embodiment, the first beam splitter 13 and the second reflecting element 15 are parts of a first prism 34, while the second beam splitter 14 and the first reflecting element 16 are parts of a second prism 35.

Said prisms 34, 35 are special custom prisms made in bulky optical transparent materials. Those one are preferably constituted by two optical parts cemented together. The reflecting elements 15 and 16 are implemented at the total internal reflection faces of the prisms 34 and 35. The beam splitters 13, 14 are located at the boundary between two cemented optical parts.

The second prism 35 is placed on the rotation plate 20, as in the previous embodiment to equalize the two interferometric paths.

The second prism 35 is also slightly rotated by a piezoelectric transducer 36 driven by the computer 8 around a second independent rotation axis perpendicular to the plane of FIG. 2. By rotating the prism 35 with the piezoelectric transducer, the phase stepping method is implemented. Except those changes, this embodiment is identical to the one described above with the FIG. 1.

The prisms 34 and 35 can be made with an extremely high accuracy and with small tolerances on the angles and on the sizes that are compatible with the accuracy that is needed for the implementation of the apparatus.

The interferometer keeps its alignment even if a prism is slightly rotated. It results that this type of interferometer is very stiff and can be used in adverse environments.

This second embodiment achieves a very compact microscope.

THIRD PREFERRED EMBODIMENT

A third preferred embodiment provides another way to create the same effect as the one obtained with the wedge 17 and its complementary optical compensator 18 as used in the first and second embodiments disclosed hereabove. In this third embodiment, the wedge 17 and the flat 18 are not present and the mirror 15 is placed on rotation and/or translation means in such a way that equalization of the optical path is kept and that the light intensity distributions are kept identical and equally positioned in the front focal planes 23 and 24 of the focusing means 6.

FOURTH PREFERRED EMBODIMENT

A fourth embodiment of the microscope is adapted to work in digital holography by implementation of the Fourier transform method instead of the phase-stepping method i.e. the microscope takes only one interference image of the sample. In this embodiment, the arrangement and composition of the interferometer arms are adapted in such a way that the intensity distributions of the two interferometer paths are equal and superposed with a controlled shift in the front focal planes 23 and 24 of the focusing mean 6.

Referring to FIG. 1, this can be achieved by adjusting the positions and orientations of the mirror 15 and 16 and/or by adjusting the positions and the orientations of the beam splitters 13 and 14, and/or by rotating or shifting the components 17 and 18.

Alternatively, referring to FIG. 2, this can be achieved by adjusting the positions and the orientations of the components 17 and 18. The resulting interfering beams on the sensor 33 of the electronic imaging device 7 are modulated by a fringe modulation. The fringe width of this modulation decreases on the sensor 33 when the shift between the intensity distributions in the focal planes 23 and 24 is increased. The role of the wedge is still to change the propagation direction of the beam reflected by 15 with respect to the beam reflected by 16.

Therefore, in this embodiment, two effects are superposed on the sensor 33. There is a fringe modulation due to the shift introduced in the focal plane 23 and 24 and there is a shift of the two images introduced by the component 17. Fringe modulated images can be processed by a specific method called Fourier transform method that makes possible to extract the optical phase and intensity from one image[27]. This embodiment has the advantage to provide an apparatus and a method to record fast digital holograms of fast phenomena as only one image is required. Hence, there is a reduction of the resolution that is inherent to the Fourier method. In that implementation, the piezoelectric transducer of mirror 16 or the piezoelectric transducer 36 does not operate.

Although the invention has been described as using a Mach-Zehnder interferometer type, it should be understood also that other interferometers with the approximately identical capabilities and adjustment means could be implemented between the microscope objective 4 and the focusing mean 6.

As illustrated by the previous embodiments, the microscope according to the invention is able to be quasi totally preadjusted independently from the samples so that minimum additional adjustements are required for obtaining reliable 3D images of samples.

Data Processing:

Holography is an optical method to record and reconstruct three-dimensional images of samples. The hologram is recorded with the electronic imaging device as for example CCD camera as disclosed hereabove or a CMOS camera.

The holographic reconstruction is performed by the computing mean 8 as disclosed above conceived such as to implement the wave optics propagation equations in order to investigate the three-dimensional image in depth.

For this purpose, the digital holographic information involves both the optical phase and the intensity information of the sample. The digital holographic information is therefore more complete than any type of interferometric information that aims to measure the alone optical path changes or variations introduced by a sample as illustrated theoretically hereafter.

Embodiments Working with the Phase Stepping Method:

The general form of the amplitude distribution in the front focal plane of the imaging mean 6 is written by:

$$u_{fl}(x,y) = u_t(x,y) + u_r(x,y) \quad (1)$$

where $u_t(x,y)$ and $u_r(x,y)$ are the transmitted and reflected amplitude distributions by the beam splitter 14 in the front focal plane of the focusing mean 6.

The following discussion refers to the system working with the phase stepping technique.

Expressing the two conditions on the microscope:
  There is a small tilt between two beams in front of the focusing mean 6. It results that the two images on the sensor 33 have a small shift that is adjusted;
  The two beams reflected and transmitted by the beam splitter 14 are in intensity equal in the front focal plane of the imaging mean 6.

There is:

$$u_t(x,y) = u_r(x,y)\exp\{j\phi\}\exp\{j2\pi(\alpha_x x + \alpha_y y)\} \quad (2)$$

where $(\alpha_x, \alpha_y)$ is the tilt vector between the propagation direction of $u_t(x,y)$ and $u_r(x,y)$, $j=\sqrt{-1}$ and $\phi$ is a global optical phase change between $u_t(x,y)$ and $u_r(x,y)$.

There is a 2D Fourier transformation relationship between the front and the back focal plane of the focusing means 6. Therefore, for the $u_t(x,y)$ contribution, the following amplitude in the sensor plane 33 is obtained:

$$U_t\left(\frac{x'}{\lambda f}, \frac{y'}{\lambda f}\right) = U_r\left(\frac{x'-\delta_x}{\lambda f}, \frac{y'-\delta_y}{\lambda f}\right)\exp(j\phi) \quad (3)$$

wherein (x',y') are the spatial coordinates in the sensor plane, $U_t$ and $U_r$ denote the Fourier transformations of $u_t$ and $u_r$, $\lambda$ is the average wavelength, f is the focal length of the focusing means 6 and $(\delta_x, \delta_y) = (\lambda f\alpha_x, \lambda f\alpha_y)$ is the shift between $U_t$ and $U_r$ in the sensor plane.

From Eqs. (2) and (3), it results that the amplitude distribution in the sensor plane is expressed:

$$U_{out}\left(\frac{x'}{\lambda f}, \frac{y'}{\lambda f}\right) = U_r\left(\frac{x'-\delta_x}{\lambda f}, \frac{y'-\delta_y}{\lambda f}\right)\exp(j\phi) + U_r\left(\frac{x'}{\lambda f}, \frac{y'}{\lambda f}\right) \quad (4)$$

$U_r$ is decomposed as:

$$U_r\left(\frac{x'}{\lambda f}, \frac{y'}{\lambda f}\right) = A_r\left(\frac{x'}{\lambda f}, \frac{y'}{\lambda f}\right)\exp\left\{j\varphi\left(\frac{x'}{\lambda f}, \frac{y'}{\lambda f}\right)\right\} \quad (5)$$

where $A_r$ is the modulus of the amplitude of $U_r$ and $\sigma$ is its phase.

It is assumed that the shift $(\delta_x, \delta_y) = (\lambda f\alpha_x, \lambda f\alpha_y)$ is small in such a way that:

$$A_r\left(\frac{x'-\delta_x}{\lambda f}, \frac{y'-\delta_y}{\lambda f}\right) \approx A_r\left(\frac{x'}{\lambda f}, \frac{y'}{\lambda f}\right) \quad (7)$$

It results that:

$$U_r\left(\frac{x'-\delta_x}{\lambda f}, \frac{y'-\delta_y}{\lambda f}\right) \approx A_r\left(\frac{x'}{\lambda f}, \frac{y'}{\lambda f}\right)\exp\left\{j\varphi\left(\frac{x'-\delta_x}{\lambda f}, \frac{y'-\delta_y}{\lambda f}\right)\right\} \quad (8)$$

Using. Eqs. (8) and (5), Eqs. (4) is written by $$U_{out}\left(\frac{x'}{\lambda f}, \frac{y'}{\lambda f}\right) =$$

$$A_r\left(\frac{x'}{\lambda f}, \frac{y'}{\lambda f}\right)\left[\exp\left\{j\varphi\left(\frac{x'-\delta_x}{\lambda f}, \frac{y'-\delta_y}{\lambda f}\right)\right\}\exp(j\phi) + \exp\left\{j\varphi\frac{x'}{\lambda f}, \frac{y'}{\lambda f}\right\}\right]$$

In order to extract the optical phase information, between $U_r$ and $U_t$, we use the phase stepping method where several interferometric images are recorded with small optical path shifts between the $U_r$ and $U_t$ by using the piezoelectric transducer of the mirror 16. For the sake of clarity, we rewrite Eq. (9) by omitting the explicit dependency on the spatial coordinates:

$$U_{out} = A_r\exp\{j\sigma\}[\exp\{j\alpha\} + 1] \quad (10)$$

Where:

$$\alpha(x,y) = \varphi\left(\frac{x'-\delta_x}{\lambda f}, \frac{y'-\delta_y}{\lambda f}\right) - \varphi\left(\frac{x'}{\lambda f}, \frac{y'}{\lambda f}\right) + \phi \quad (11)$$

There exists different phase stepping methods that are using several numbers of interferometric images. The method with four images is disclosed hereafter, but methods with different image numbers can be used.

The method using 4 interferometric images introduces incremental optical phase shifts of $0, \pi/2, \pi, 3\pi/2$. The four interferometric amplitudes are defined by:

$$U_{out}(0) = A_r\exp\{j\sigma\}[\exp\{j(\alpha)\} + 1]$$

$$U_{out}\left(\frac{\pi}{2}\right) = A_r\exp\{j\varphi\}\left[\exp\left\{j\left(\alpha + \frac{\pi}{2}\right)\right\} + 1\right]$$

$$U_{out}(\pi) = A_r\exp\{j\sigma\}[\exp\{j(\alpha+\pi)\} + 1]$$

$$U_{out}\left(\frac{3\pi}{2}\right) = A_r\exp\{j\varphi\}\left[\exp\left\{j\left(\alpha + \frac{3\pi}{2}\right)\right\} + 1\right]$$

As the images are detected in intensities, the intensities corresponding to the amplitudes of Eqs. (11) are given by:

$$I_{out}(0)=2A_r^2[1+\cos(\alpha)]$$

$$I_{out}\left(\frac{\pi}{2}\right) = 2A_r^2[1-\sin(\alpha)]$$

$$I_{out}(\pi)=2A_r^2[1-\cos(\alpha)]$$

$$I_{out}\left(\frac{3\pi}{2}\right) = 2A_r^2[1+\sin(\alpha)]$$

The optical phase α is obtained as follows:

$$\alpha = \text{Arctan}_{2\pi}\left\{\frac{I_{out}\left(\frac{3\pi}{2}\right)-I_{out}\left(\frac{\pi}{2}\right)}{I_{out}(0)-I_{out}(\pi)}\right\} \quad (14)$$

Thanks to the Eq. (14), the optical phase difference between $U_r$ and $U_t$ is quantitatively determined with an additive phase constant φ. This last one can be removed by several ways.

The simplest way is to perform a phase measurement without sample that will be considered after as the phase φ to be removed. Therefore, it is assumed that the quantitative information about the optical phase difference $$\varphi\left(\frac{x'-\delta_x}{\lambda f},\frac{y'-\delta_y}{\lambda f}\right)-\varphi\left(\frac{x'}{\lambda f},\frac{y'}{\lambda f}\right)$$

is obtained.

The addition of the different Eq. (13) provides the quantity $A_r^2$ which is the intensity information on the sample without phase information.

Another way to obtain the intensity information is achieved by recording one image with the shutter 32 closed. As the signals are sampled in the detection plane with a sampling distance $\Delta_s$, it will be noted in the following the detected intensity by:

$$A_{Dr}^2(\Delta_s k, \Delta_s l) = A_r^2\left(\frac{k\Delta_s}{\lambda f},\frac{l\Delta_s}{\lambda f}\right) \quad (15)$$

Where the subscript D refers to a discrete function.

Therefore, the proposed optical system and related interferometric methods provide the complete information about the intensity and the differential phase information on the sample.

The knowledge of the optical phase of the sample is determined by integrating the differential phase along the differential direction.

For simplicity and without restricting the generality of the discussion as the generalization is obvious, it is assumed that the optical phase difference is along the x axis and that the sign of $\delta_x$ is negative.

Taking into account that the signals are sampled with the distance $\Delta_s$ in the sensor plane 33, the differential phase information that is recorded is given by:

$$\Delta\varphi_D(k\Delta_s, l\Delta_s) = \varphi\left(\frac{k\Delta_s+|\delta_x|}{\lambda f},\frac{l\Delta_s}{\lambda f}\right)-\varphi\left(\frac{k\Delta_s}{\lambda f},\frac{l\Delta_s}{\lambda f}\right) \quad (16)$$

The subscript D refers to a discrete function.

The sampling distance is assumed to be adapted to record the information without loss of significant information, i.e. without aliasing effect. In this case, the differential phase information can be expressed by:

$$\Delta\sigma_D(k\Delta_s,l\Delta_s)=C(\sigma_D(k\Delta_s,l\Delta_s)-\sigma_D((k-1)\Delta_s,l\Delta_s)) \quad (17)$$

where $\sigma_D(k\Delta_s,l\Delta_s)$ is the optical phase at the sampling position(k,l) and C is a constant that is depending on the original differential distance $\delta_x$. C has to be determined by a calibration process that is performed by inserting a calibrated wedge before using the instrument for actual measurements.

By summing $\Delta\sigma_D(k\Delta_s,l\Delta_s)$ from k=1, ..., t, the phase $\sigma_D(t\Delta_s,l\Delta_s)$ is obtained with an additional integration constant.

In most cases, the additional integration constant can be assumed identical for every line and is finally giving a constant over the complete field of view that does not play any significant role.

It results that the optical phase $\sigma_D$ and amplitude modulus $A_D$ have been determined to implement the digital holographic reconstruction process.

Embodiments for Fast Phenomena Working with the Fourier Method

The following description refers to the embodiments of the microscope working with the Fourier method, where the complete digital holographic phase and amplitude are extracted from a single interference pattern.

Expressing the two apparatus conditions:

There is a small tilt between two beams in front of the focusing mean 6. It results that the two images on the sensor 33 have a small shift that is adjusted;

The two beams reflected and transmitted by the beam splitter 14 are in intensity equal shifted by in the front focal plane of the imaging mean 6. Without restricting the generality of the discussion, we assume that the shift is in the x direction and denoted by $s_x$.

Then:

$$u_t(x,y)=u_r(x+s_x,y)\exp\{j\phi\}\exp\{j2\pi(\alpha_x x+\alpha_y y)\} \quad (18)$$

where $(\alpha_x,\alpha_y)$, $j=\sqrt{-1}$ and φ are defined as above.

There is a 2D Fourier transformation relationship between the front and the back focal plane of the focusing means 6. Therefore, for the $u_t(x,y)$ contribution, the following amplitude in the sensor plane 33 is obtained:

$$U_t\left(\frac{x'}{\lambda f},\frac{y'}{\lambda f}\right) = U_r\left(\frac{x'-\delta_x}{\lambda f},\frac{y'-\delta_y}{\lambda f}\right)\exp(j\phi)\exp\left(2\pi j\left(s_x\left(\frac{x'-\delta_x}{\lambda f}\right)\right)\right) \quad (19)$$

wherein (x',y') are the spatial coordinates in the sensor plane, $U_t$ and $U_r$ denote the Fourier transformations of $u_t$ and $u_r$, λ is the average wavelength, f is the focal length of the focusing mean 6 and $(\delta_x, \delta_y) = (\lambda f\alpha_x, \lambda f\alpha_y)$ is the shift between $U_t$ and $U_r$ in the sensor plane.

As for the phase-stepping method, the amplitude in the sensor plane is computed with the same approximation and it results finally that the detected intensity can be expressed by:

$$I_{out}(x', y') = 2A_r^2 \left[ 1 + \cos\left(\alpha(x', y') + 2\pi s_x \frac{x'}{\lambda f}\right) \right] \quad (20)$$

Where $\alpha(x',y')$ represents the optical phase difference between $U_t$ and $U_r$.

Comparatively to the phase-stepping method, it is observed that there is a fringe modulation that is as fast as $s_x$ is important. Based on such a mathematical expression, there is the Fourier method that is able to extract $A_r$ and $\alpha(x',y')$ [27].

When those quantities are extracted, the absolute optical phase is obtained by integration as for the phase-stepping method. The discrete quantities $A_D$ and $\phi_D$ are defined as for the phase-stepping method and can be directly used for the digital holography.

Digital Holography Implementation

From the description above, it is assumed that the optical phase $\phi_D$ and the modulus of the amplitude $A_D$ have been obtained in the focus plane of the sample.

It results that the complex amplitude field in this plane can be computed according to:

$$U_{Di}(r\Delta_s, t\Delta_s) = A_D(r\Delta_s, t\Delta_s) \exp\{j\phi_D(r\Delta_s, t\Delta_s)\} \quad (21)$$

Thanks to this information, digital holographic reconstruction technique can be used for imaging planes that are out of focus. This is achieved by implementing a discrete form of the Kirchhoff-Fresnel integral:

$$U_{Do}(r'\Delta_s, t'\Delta_s) = \qquad (22)$$
$$\exp\{jkd\} F_{r',t'}^{-1} \exp\left\{\frac{-jk\lambda^2 d}{2N^2 \Delta_s^2}(U^2 + V^2)\right\} F_{U,V}^{+1} U_{Di}(r\Delta_s, t\Delta_s)$$

where, $U_{Di}$ is the measured complex amplitude, $U_{Do}$ is the complex amplitude reconstructed after a refocusing distance of d, $F_{U,V}^{+1}$ is the discrete Fourier transformation, $F_{r',t'}^{-1}$ is the inverse discrete Fourier transformation, N, is the sample number along the both axis, $k=2\pi/\lambda$ and (U,V) are integers varying from 0 to N−1.

A detailed discussion about the implementation and the range of refocusing distance that can be achieved by digital holography process is discussed in details in prior art documents[15].

Applications and Advantages of the Invention in Comparison with the State of Art The present invention is related to an apparatus and a process for three-dimensional microscopy by digital holography that results from the integration of a specific differential interferometer into an optical microscope imaging system. The present invention is configured in such a way that it supports the most important microscopy modes as bright field, dark field, fluorescence, differential contrast, phase contrast that are of interest in the major applications in optical microscopy.

The present invention can be advantageously used in the non-invasive study and characterisation of different kinds of samples, in particular for the in vivo imaging of thick living biological samples in order to observe their dynamical behaviours with low temporal distortion.

The present invention also allows the measurement of three-dimensional micro-distributions of refractive indexes inside thick transparent samples. It is meant by "thick sample" that the thickness is too large to obtain a focus image of the sample over the full thickness by classical optical process.

The present invention presents various advantages comparatively to the ones of the state of the art.

The system is able to work in transmission, in reflection and with a wide range of spatial coherence states of the source. Comparatively to the systems using laser beam, the present apparatus and process considerably improve the image quality thanks to the fact that partially coherent illumination can be used.

In addition, comparatively to others systems using partially coherent illumination with the sample in one of the interferometer arm, the present apparatus and process allow to investigate samples with stronger optical phase distortions, and the accurate optical length adjustment of the interferometric arms is performed independently upon the sample and once said adjustment has been made, the system is ready to be used for every sample.

An important application of the present invention is the observation of fluorescent samples. In particular, the present invention allows the non-invasive three-dimensional in vivo imaging of the dynamic behavior of fluorescent macromolecules or structures, without the temporal distortion of the laser scanning microscopy.

With respect to the previous implementations[21-22] for the fluorescence in digital holography, the proposed method allows to achieve much better quality.

For a direct implementation of digital holography with a fluorescent image, methods and apparatus have been already proposed, see the references 19-20. Although configurations 19, 20 could be theoretically used for fluorescence signals, the authors recognized that the results could be of very poor quality due to the weak contrast of the interferometric signal. No results with fluorescence are provided in those references. At this point, it is very important to emphasize the differences of the present invention comparatively to the configurations proposed in references 19 and 20. Indeed, those configurations seem to be similar to the ones proposed in the present invention as they are also based on Mach-Zehnder or Michelson interferometers placed between the microscope lens and the imaging plane. However, the implementation, the working modes and the performances of those systems are very different to the present apparatus and methods. The differences are the following.

In the present configurations, the two channels of the interferometer are imaged in the same way on the sensor plane. The difference between the two channels is a small shift between the two beams on the sensor. The apparatus is recording fringe interference patterns between two slightly shifted images. There is a same intensity light in the two channels. Moreover, the shift is small in comparison with the spatial coherence width in such a way that the interferometric contrast is high.

In the configurations proposed in references 19-20, the authors are describing the implementation of absolute interferometric configurations. In order to achieve this goal, one of the interferometric channels, the reference channel, is optically filtered by an aperture to remove any details of the original sample and to achieve a large point spread function in the sensor plane. The second beam, the object beam, that is carrying the sample information is incident on the sensor without filtering process and is interfering with the reference beam. As the reference beam is filtered, there is a large intensity difference between the two beams that obliges the authors to reduce the object beam intensity by a neutral density filter. Therefore, there is an important loss of light intensity that can be critical for application where the intensity levels are weak. The sensor records the interference pattern between the object and the reference beams. In order to optimize the fringe visibility, the authors are placing the sensor plane out of focus in such a way that the defocus spread has a size similar to the point spread function of the reference beam. This is a major difference with respect to the present embodiments: in the present invention, samples close to surrounding the focus plane can be analysed for every planes. As demonstrated in reference 15, the digital holographic process is more powerful with respect to the resolution when the sample is close to the focus plane. Moreover, even with the similar point spread function sizes, the configurations of references 19 and 20 have poor interferometric fringe visibility due to the partial coherent nature of the illumination. In the present proposed configurations, the phase contrast is high even in the case of incoherent illumination.

Considering references 21 and 22, said documents disclose apparatus and methods used for 3D fluorescent imaging. However, those systems are very different to the present one and request a scanning of the samples.

With respect to 3D imaging of fluorescent samples, the confocal microscopes are the dominant systems. Compared with confocal microscopes, the present microscope and method present the following advantages:

There is no need to scan in 3D the sample. Therefore, the acquisition can be faster;

No coherent laser spot is used to scan the sample. The illumination level is therefore weaker and less invasive for the sample;

basically, the present apparatus and method are less expensive.

Confocal microscopes are very powerful instruments that provide very high quality results. The major features of the confocal microscopes are the optical sectioning and the capability to remove the noise. With respect to these points, confocal microscopes keep the advantage. Therefore, the apparatus proposed here is more complementary than concurrent with respect to the confocal microscopes.

Furthermore, with respect of the implementation of the patent application WO03/002972, the present apparatus and process do not require that the fluorescence regions are coinciding with regions having different optical refractive indexes or transmittances.

With respect to confocal microscopy, the recording of the information does not request 3D scanning, which is time consuming. The proposed invention is more flexible for the selection of the fluorescent excitation source. In particular, the selected sources can be less harmful for living specimens than the ones used in confocal microscopy. A wide range of fluorochromes can be studied. The fluorecent images can be combined with the results obtained in the other microscopy modes provided by the present apparatus and process.

Differential Contrast Microscopy

The present apparatus and process is also able to work as a new type of differential interference contrast (DIC) microscope and presents some advantages with respect to the classical implementations.

Indeed, the classical implementations are using components that take benefits of polarization effects (for example, Normarski microscopes). Therefore, those systems are in general very sensitive to polarization residual birefringence disturbances introduced by the sample containers. Those issues are completely removed with the present apparatus and process.

In addition, in comparison to the Hoffman modulation contrast microscopy, the present proposed configurations use in a more efficient way the numerical aperture of the microscope lens that is fully exploitable. It has also to be emphasized that the present invention gives rise to quantitative phase measurement while systems such as the classical DIC systems are mainly qualitative.

Optical Sectioning of Transparent Samples

Moreover, the present apparatus and process also allow investigating the problem of measuring three-dimensional micro-distributions of refractive indexes. In this situation, the source that is used has a very low spatial coherence and the sample is investigated by translating the sample along the optical axis to focus it slice by slice. As the spatial coherence of the source is very limited, the slicing effect is very high and it is possible to reconstruct the three-dimensional refractive index distributions.

The alternative solution to perform the same type of measurement is the optical transmission tomography. However, in this case, it is necessary to use multiple beams and multiple detectors and the state of the art in this field shows that only very simple situations can be actually investigated.

REFERENCES

1. U. Schnars and W. Jüptner, "Direct recording of holograms by a CCD target and numerical reconstruction", Appl. Opt. 33, 179-181 (1994).
2. K. Creath, "Temporal Phase Measurement Methods", in Interferogram Analysis: digital fringe pattern analysis/ edited by D. W. Robinson, G. T. Reid, IOP Publishing Ltd, 94-140 (1993)
3. I. Yamaguchi and T. Zhang, "Phase-shifting digital holography", Opt. Lett. 22, 1268-1270 (1997).
4. B. Skarman, K. Wozniac and J. Becker "Simultaneous 3D-PIV and temperature measurement using a New CCD based holographic interferometer", Flow Meas. Instr. 7, No. 1, pp 1-6 (1996)
5. T. M. Kreis, W. P. O. Jüptner, "Principle of digital holography", Proc. Of the $3^{rd}$ international workshop on automatic processing of fringe patterns (Fringe '97), Akademie Verlag Series in Optical Metrology, Berlin, held in Bremen, 353-363, 15-17 Sept. (1997)
6. B. Nilsson and T. E. Carlsson, Direct three-dimensional shape measurement by digital light-in-flight holography, Appl. Opt. 37, 7954-7959 (1998).
7. E. Cuche, F. Bevilacqua and C. Depeursinge, "Digital holography for quantitative phase contrast imaging", Opt. Lett. 24, 291-293 (1999)
8. D. O. Hogenboom, C. A. Dimarzio, T. J. Gaudette, A. J. Devaney, S. C. Lindberg, "Three-dimensional images generated by quadrature interferometry", Opt. Lett. 23, 783-785 (1998).

9. M. Adams, T. M. Kreis, W. P. O. Jüptner, "Particle size and position measurement with digital holography", Proc. SPIE 3098, 234-240 (1998)
10. E. Cuche, P. Marquet and C. Depeursinge, <<Spatial filtering for zero-order and twin-image elimination in digital off-axis holography", Appl. Opt. 39, 4070-4075 (2000)
11. B. Javidi, E. Tajahuerce, <<Encrypting three-dimensional information with digital holography >> Opt. Lett. 39, 6595-6601 (2000)
12. F. Dubois, L. Joannes, O. Dupont, J. L. Dewandel and J. C. Legros, "An integrated optical set-up for fluid-physics experiments under microgravity conditions", Meas. Sci. Technol., vol. 10, 934-945 (1999).
13. T. Zhang and I. Yamaguchi, "Three-dimensional microscopy with phase-shifting digital holography", Opt. Lett. 23, 1221-1223 (1998).
14. I. Yamaguchi, J.-I. Kato, S. Otha and J. Mizuno, <<image formation in phase-shifting digital holography and applications to microscopy "Appl. Opt. 40, 6177-6186 (2001)
15. F. Dubois, L. Joannes, J.-C. Legros, "Improved three-dimensional imaging with digital holography microscope using a partial spatial coherent source" Appl. Opt. 38, 7085-7094 (1999)
16. F. Dubois, O. Monnom, C. Yourassowsky and J.-C. Legros, "Border processing in digital holography by extension of the digital hologram and reduction of the higher spatial frequencies", Appl. Opt. 41, 2621-2626 (2002)
17. F. Dubois, C. Minetti, O. Monnom, C. Yourassowsky, J.-C. Legros, <Pattern recognition with digital holographic microscope working in partially coherent illumination", Appl. Opt. 41, 4108-4119 (2002)
18. F. Dubois and C. Yourassowsky, "Procédé et dispositif destinés à l'obtention par microscopie d'images en trois dimensions d'un èchantillon >>, Demande PCT 01-07-2002, No. de dépôt PCT/BE02/00111—priorités: EP-01870147.4-29 juin 2001, EP-01870281.1-18 décembre 2001
19. "P. Klysubun and G. Indebetouw, <<A posteriori processing of spatiotemporal digital microholograms >>, J. Opt. Soc. Am. A 18, 326-331 (2001)
20. "P. Klysubun and G. Indebetouw, <<Spatiotemporal digital microholography >>, J. Opt. Soc. Am. A 18, 319-325 (2001)
21. B. W. Schilling, T.-C. Poon, G. Indebetouw, B. Storrie, K. Shinoda, Y. Suzuki and M. H. Wu, "Three-dimensional holographic fluorescence microscopy", Opt. Lett. 19, 1506-1508 (1997)
22. G. Indebetouw, T. Kim, T.-C. Poon and B. W. Schilling, "Three-dimension location of fluorescent inhomogeneities in turpid media by scanning heterodyne holography", Opt. Lett. 23, 135-137 (1998)
23. D. W. Robinson and G. T Reid—Editors, "Interferogram Analysis" (Institute of Physics Publishing, 1993)
24. Frank Dubois, Maria-Luisa Novella Requena, Christophe Minetti, Olivier Monnom, and Eric Istasse, "Partial spatial coherence effects in digital holographic microscopy with a laser source", Appl. Opt. IP 43, 1131-1139 (2004)
25. G. Pretzler, H. Jäger and T. Neger, "High accuracy differential interferometry for the investigation of phase object", Meas. Sc. Technol. 4, 649-658 (1993)
26. Y. Y. Hung and al. "Measurement of slopes of structural deflections by speckle-shearing interferometry", Experimental Mechanics, 281-285, July 1984
27. T. Kreis, "Digital holographic interference-phase measurement using the Fourier-transform method", J. Opt. Soc. Am. A. 3, 847-855 (1986)
28. J. Shamir, "Optical Systems and Processes", SPIE Optical Engineering Press, Washington 1999-Temporal Coherence 131-132, Spatial coherence 136-137.
29. J.-P. Chavel, "Optical noise and temporal coherence," J. Opt. Soc. Am. 70, 935-943 (1980)

The invention claimed is:

1. A microscope able to work in digital holography for obtaining three dimensional (3D) images of a sample, said microscope comprising as elements at least:
    (i) illumination means for illuminating in transmission and/or in reflection a sample and producing thereby a sample beam, said illumination means being characterised by a given spectral width having a maximum illumination wavelength;
    (ii) imaging means comprising a microscope objective having a front focal plane, and focusing means having a back focal plane;
    (iii) an interferometer for generating interfering beams from the sample beam, said interferometer being located behind the microscope objective and in front of the focusing means, and comprising a first interferometer arm and a second interferometer arm, the focusing means having one front focal plane in each of said first and second interferometer arms, said first interferometer arm comprising a first beam splitter a first reflecting element and a second beam splitter, said second interferometer arm comprising the first beam splitter, a second reflecting element and the second beam splitter, wherein some of said reflecting elements and beam splitters are mounted on a moving means so as to equalise the optical length of the interfering beams with an accuracy in the range of less than the maximum wavelength of the illumination means to a few maximum wavelengths;
    (iv) an electronic imaging devices provided with a sensor which is located in the back focal plane of the focusing means, for detecting and recording the fringe interference images formed thereon by the interfering beams;
    (v) processing means conceived for at least processing said fringe interference images by digital holography techniques;
wherein said microscope further comprises:
    (vi) a positioning stage located outside the interferometer in front of the microscope objective for positioning the sample substantially in the front focal plane of the microscope objective;
    (vii) tilting means located in the second interferometer arm, respectively in the first interferometer arm, for tilting the beam reflected by the second reflecting element, respectively first reflecting element, relatively to the beam reflected by the first reflecting element, respectively the second reflecting element, by a precise tilting angle in such a way to superpose the beam reflected by the first reflecting element, respectively the second reflecting element, and the beam reflected by the second reflecting element, respectively the first reflecting element, in a set of front focal planes of the focusing means thereby creating a precise shift between the interfering beams reflected and transmitted by the second beam splitter on the sensor of the electronic imaging device, wherein the set of front focal planes comprises a first front focal plane of the focusing means corresponding to the first interferometer arm and a second front focal plane of the focusing means corresponding to the second interferometer arm.

2. The microscope according to claim 1, wherein the first reflecting element corresponds to a first mirror, the second reflecting element corresponds to a second mirror and the first mirror and the second beam splitter are mounted together on the moving means.

3. The microscope according to claim 1, wherein the first beam splitter and the second reflecting element are parts of a first prism, while the second beam splitter and the first reflecting element are parts of a second prisms, the first prism being mounted on the moving means.

4. The microscope according to claim 1, wherein said tilting means comprise a wedge and the microscope comprises a complementary optical compensator in the first interferometer arm, respectively the second interferometer arm.

5. The microscope according to claim 1, wherein said tilting means comprise the second reflecting element mounted on translation and/or rotation means.

6. The microscope according to claim 1, wherein the first reflecting element is mounted on a transducer, preferably a piezo-electric transducer, of calibrated motions to implement a digital holography processing by the processing means according to a phase-stepping method.

7. The microscope according to claim 1, further comprising shifting means for shifting with a precise shift the beam reflected by the first reflecting element, the second reflecting element, relatively to the beam reflected by the second reflecting element, the first reflecting element, in the first and second front focal planes of the focusing means so as to introduce a precise fringe modulation at the interfering beams reflected and transmitted by the second beam splitter compatible with a digital holography processing by the processing means according to the Fourier transform method.

8. The microscope according to claim 7, wherein said shifting means comprise the first reflecting element and the second beam splitter mounted on the moving means.

9. The microscope according to claim 7, wherein said shifting means comprise a wedge mounted on translation and/or rotation means.

10. The microscope according to claim 7, wherein said shifting means comprise the second mirror mounted on translation and/or rotation means.

11. The microscope according to claim 7, wherein the microscope is used to study fast phenomena.

12. The microscope according to claim 1, wherein the moving means comprise a rotating plate.

13. The microscope according to claim 1, wherein the microscope is used to study fluorescent and/or thick samples.

14. The microscope according to claim 1, wherein the microscope is used to perform differential contrast microscopy.

15. The microscope according to claim 1, wherein the microscope is used in in vivo 3D imaging applications.

16. The microscope according to claim 1, wherein the microscope is used to measure three-dimensional microdistributions of refractive indexes in a sample.

17. The microscope according to claim 1, wherein said illumination means is selected from the group consisting of temporally coherent and spatially partially coherent illumination means, temporally and spatially partially coherent illumination means, and fluorescence excitation sources.

18. A method of obtaining three dimensional (3D) images of a sample using a digital holographic microscope having an illumination means, an imaging means including an objective and a focusing means, a differential interferometer, an electronic imaging device and a processing means, a positioning stage, and a tilting means, said method comprising:
    placing the positioning stage outside the interferometer in a front focal plane of the microscope objective;
    positioning the electronic imaging device so that its sensor is placed in a back focal plane of the focusing means;
    positioning the interferometer between the objective and the focusing means,
    placing at least some of a plurality of reflecting elements and beam splitters of the interferometer on a moving means so as to form a movable part;
    performing position and orientation preadjustments of the microscope by addition of a test sample, by:
    (i) placing the test sample on the positioning stage;
    (ii) illuminating in transmissions and/or in reflections with the illumination means said test sample and producing thereby a test sample beam;
    (iii) generating by means of the interferometer interfering beams from said test sample beam;
    (iv) adequately positioning and orientating the movable part of the interferometer so as to equalise the optical length of said interfering beams with an accuracy in the range of less than the maximum wavelength of the illumination means to a few maximum wavelengths by means of the moving means;
    (v) adequately positioning and orientating the tilting means in a second interferometer arm, respectively in a first interferometer arm, for tilting the beam reflected by a second reflecting element, respectively a first reflecting element, relatively to the beam reflected by the first reflecting element, respectively the second reflecting element, by a precise tilting angle in such a way to superpose the beam reflected by the first reflecting element, respectively the second reflecting element, and the beam reflected by the second reflecting element, respectively the first reflecting element, in a set of front focal planes of the focusing means thereby creating a precise shift between the interfering beams reflected and transmitted by a second beam splitter on the sensor of the electronic imaging device, wherein the set of front focal planes comprises a first front focal plane of the focusing means corresponding to the first interferometer arm and a second front focal plane of the focusing means corresponding to the second interferometer arm;
    (vi) detecting and recording a fringe interference image thus formed by the interfering beams on the sensor of the imaging device;
    after pre-adjustment, replacing the test sample by a sample to be studied and
    illuminating said sample so as to obtain an interference image as disclosed in (i) to (vi);
    recording said interference image;
    processing said interference image(s) so as extract an optical amplitude and phase of the sample by implementation of a phase stepping method or a Fourier transform data processing.

19. The method according to claim 18, wherein said tilting means comprise a wedge and the microscope comprises a complementary optical compensator in the first interferometer arm, respectively the second interferometer arm.

20. The method according to claim 18, wherein said tilting means comprise the second reflecting element mounted on translation and/or rotation means.

21. The method according to claim 18, wherein the first reflecting element is placed on a transducer, preferably a piezoelectric transducer to implement the phase-stepping method.

22. The method according to claim 18, further comprising shifting by means of shifting means with a precise shift the beam reflected by the first reflecting element, the second reflecting element, relatively to the beam reflected by the second reflecting element, the first reflecting element, in the first and second front focal planes of the focusing means so as to introduce a precise fringe modulation at the interfering beams reflected and transmitted by the second beam splitter compatible with a digital holography processing by the processing means according to the Fourier transform method.

23. The method according to claim 22, wherein said shifting means comprise the first reflecting element and the second beam splitter mounted on the moving means.

24. The method according to claim 22, wherein said shifting means comprise a wedge mounted on translation and/or rotation means.

25. The method according to claim 22, wherein said shifting means comprise the second reflecting element mounted on translation and/or rotation means.

26. The method according to claim 18, wherein the moving means comprise a rotating plate.

27. The method according to claim 18, additionally comprising studying and/or thick samples by use of the microscope.

28. The method according to claim 18, additionally comprising performing differential contrast microscopy by use of the microscope.

29. The method according to claim 18, additionally comprising using the microscope in in vivo 3D imaging applications.

30. The method according to claim 18, additionally comprising measuring three dimensional micro-distributions of refractive indexes in a sample by use of the microscope.

31. The method according to claim 18, additionally comprising studying fast phenomena by use of the microscope.

32. The method according to claim 18, additionally comprising acquiring other similar interference images from said sample by implementation of the phase-stepping method.

* * * * *

UNITED STATES PATENT AND TRADEMARK OFFICE
CERTIFICATE OF CORRECTION

PATENT NO.       : 7,362,449 B2
APPLICATION NO. : 10/557240
DATED            : April 22, 2008
INVENTOR(S)      : Frank Dubois et al.

It is certified that error appears in the above-identified patent and that said Letters Patent is hereby corrected as shown below:

Title page, Column 2, Line 27 (in the Abstract), delete "angle one the interfering beams" and insert -- angle one of the interfering beams --, therefor.

Column 1, Line 3, below "TITLE" insert -- CROSS REFERENCES TO RELATED APPLICATIONS --.

Column 2, Line 67, delete "differenciate" and insert -- differentiate --, therefor.

Column 12, Line 52, delete "adjustements" and insert -- adjustments --, therefor.

Column 13, Line 45 (approximately), delete "u," and insert -- $u_t$ --, therefor.

Column 13, Line 66, delete "σ" and insert -- φ --, therefor.

Column 14, Line 17 (approximately), delete "by" and insert -- by: --, therefor.

Column 14, Line 24 (approximately), delete " $\exp\left\{j\varphi\frac{x'}{\lambda f},\frac{y'}{\lambda f}\right\}\right]$ " and insert -- $\exp\left\{j\varphi\left(\frac{x'}{\lambda f},\frac{y'}{\lambda f}\right)\right\}\right]$ --, therefor.

Column 14, Line 24 (approximately), after

" $U_{out}\left(\frac{x'}{\lambda f},\frac{y'}{\lambda f}\right) = A\left(\frac{x'}{\lambda f},\frac{y'}{\lambda f}\right)\left[\exp\left\{j\varphi\left(\frac{x'-\delta_x}{\lambda f},\frac{y'-\delta_y}{\lambda f}\right)\right\}\exp(j\phi) + \exp\left\{j\varphi\left(\frac{x'}{\lambda f},\frac{y'}{\lambda f}\right)\right\}\right]$ " insert -- (9) --.

Column 14, Line 36, delete "σ" and insert -- φ --, therefor.

Column 14, Line 52, delete "σ" and insert -- φ --, therefor.

Column 14, Lines 52 to 64, remove indentations on Line 57 (approximately) and Line 64 (approximately) and align left the four equations.

Column 14, Line 58, to the right of the four equations insert -- (12) --.

Column 14, Line 60, delete "σ" and insert -- φ --, therefor.

Column 15, Lines 3 to 14, remove indentations on Line 7 (approximately) and on Line 14 (approximately) and align left the four equations.

Column 15, Line 8, to the right of the four equations insert -- (13) --.

Column 16, Line 7, delete " $\varphi\left(\frac{k\Delta_s}{\lambda_f},\frac{l\Delta_s}{\lambda f}\right)$ " and insert -- $\varphi\left(\frac{k\Delta_s}{\lambda f},\frac{l\Delta_s}{\lambda f}\right)$ --, therefor.

CERTIFICATE OF CORRECTION (continued)
U.S. Pat. No. 7,362,449 B2

Column 16, Line 16, delete "$\Delta\sigma_D(k\Delta_s, l\Delta_s)=C(\sigma_D(k\Delta_x, l\Delta_s)-\sigma_D((k-1)\Delta_s, l\Delta_s))$" and insert -- $\Delta\varphi_D(k\Delta_s, l\Delta_s)=C(\varphi_D(k\Delta_s, l\Delta_s)-\varphi_D((k-1)\Delta_s, l\Delta_s))$ --, therefor.

Column 16, Line 17, delete "$\sigma$" and insert -- $\varphi$ --, therefor.

Column 16, Line 24, delete "$\sigma$" and insert -- $\varphi$ --, therefor.

Column 16, Line 25, delete "$\sigma$" and insert -- $\varphi$ --, therefor.

Column 16, Line 31, delete "$\sigma_D$" and insert -- $\varphi_D$ --, therefor.

Column 16, Line 66, delete "u," and insert -- $u_1$ --, therefor.

Column 17, Line 33, delete "$U_{DI}(r\Delta_s, t\Delta_s)$" and insert -- $U_{Di}(r\Delta_s, t\Delta_s)$ --, therefor.

Column 17, Line 46, delete "$U_{DO}$" and insert -- $U_{Do}$ --, therefor.

Column 19, Line 65, delete "fluorecent" and insert -- fluorescent --, therefor.

Column 20, Line 8, delete "Normarski" and insert -- Nomarski --, therefor.

Column 21, Line 54, delete "turpid" and insert -- turbid --, therefor.

Column 22, Line 39, in Claim 1, delete "devices" and insert -- device --, therefor.

Column 23, Line 11, in Claim 3, delete "prisms," and insert -- prism, --, therefor.

Column 24, Line 20, in Claim 18, delete "transmissions and/or reflections" and insert -- "transmission and/or in reflection --, therefor.

Signed and Sealed this

Twenty-third Day of March, 2010

David J. Kappos
*Director of the United States Patent and Trademark Office*